United States Patent [19]

Tyler et al.

[11] 3,902,047

[45] Aug. 26, 1975

[54] LABEL READER WITH ROTATABLE TELEVISION SCAN

[75] Inventors: Anton Roy Tyler; Vickram Sondhi, both of Toronto; Ralph Sherwill Cass, Weston, all of Canada

[73] Assignee: Ferranti-Packard Limited, Toronto, Canada

[22] Filed: Aug. 31, 1973

[21] Appl. No.: 393,552

[52] U.S. Cl....... 235/61.11 E; 235/61.12 N; 178/7.7

[51] Int. Cl.[2] .......................................... G06K 7/10

[58] Field of Search ........... 178/6, 6.8, 7.1, 7.2, 7.7, 178/DIG. 1; 235/61.11 E, 61.12 RN; 340/146.3 K, 146.3 H

[56] References Cited

UNITED STATES PATENTS

| | | | |
|---|---|---|---|
| 3,246,126 | 4/1966 | Schlieben et al. | 235/61.11 E |
| 3,600,556 | 8/1971 | Acker | 235/61.11 E |
| 3,644,714 | 2/1972 | Phillips et al. | 235/61.11 E |
| 3,774,014 | 3/1972 | Berler | 235/61.11 E |
| 3,803,445 | 4/1974 | Wagner | 178/7.7 |

*Primary Examiner*—Stanley M. Urynowicz, Jr.
*Attorney, Agent, or Firm*—Westell & Hanley

[57] ABSTRACT

A surface containing encoded information bordered by bars where both the bars and the information contrast with a background is detected as to orientation and location and the information read by sampling the video scan output of a television camera which is designed to raster scan the image formed therein. The camera may be caused to scan with alternating rasters at an angle, preferably 90°, to one another while the orientation of the raster relative thereto is determined. The orientation of the raster scan may be rotated by electronic means, to provide the desired orientation of the raster relative to the information.

14 Claims, 16 Drawing Figures

LABEL READER WITH ROTATABLE TELEVISION SCAN

This invention relates to means and a method for detecting by the use of a televsion camera, coded information on the surfaces of objects moving relative to the viewing axis of the television camera.

It is an object of this invention to provide means and a method utilizing a television camera.to produce in the camera, an image of a surface carrying coded information, whose path is arranged to pass through the field of view of the camera, and to scan in a given direction the image of the object, to electronically rotate the scan to a more suitable angle, if necessary and to analyze the video scan output signal resulting from such scan.

It is an object of this invention to provide means and a method utilizing a television camera to scan in a predetermined direction to detect coded information on a surface within its field of view, wherein markings on said surface accompanying said coded information are detected to determine when the surface is within the field of view of said camera and to determine the orientation of the information relative to the scan direction.

It is an object of this invention to provide means and a method utilizing a television camera to detect said coded information on a surface within its field of view, wherein markings on said surface accompanying said coded information are detected to determine the orientation of said surface and determination of the scan results in electronic rotation of the televisiosn scan to the extent necessary to achieve a more suitable angle for scanning the information.

Figure 5:
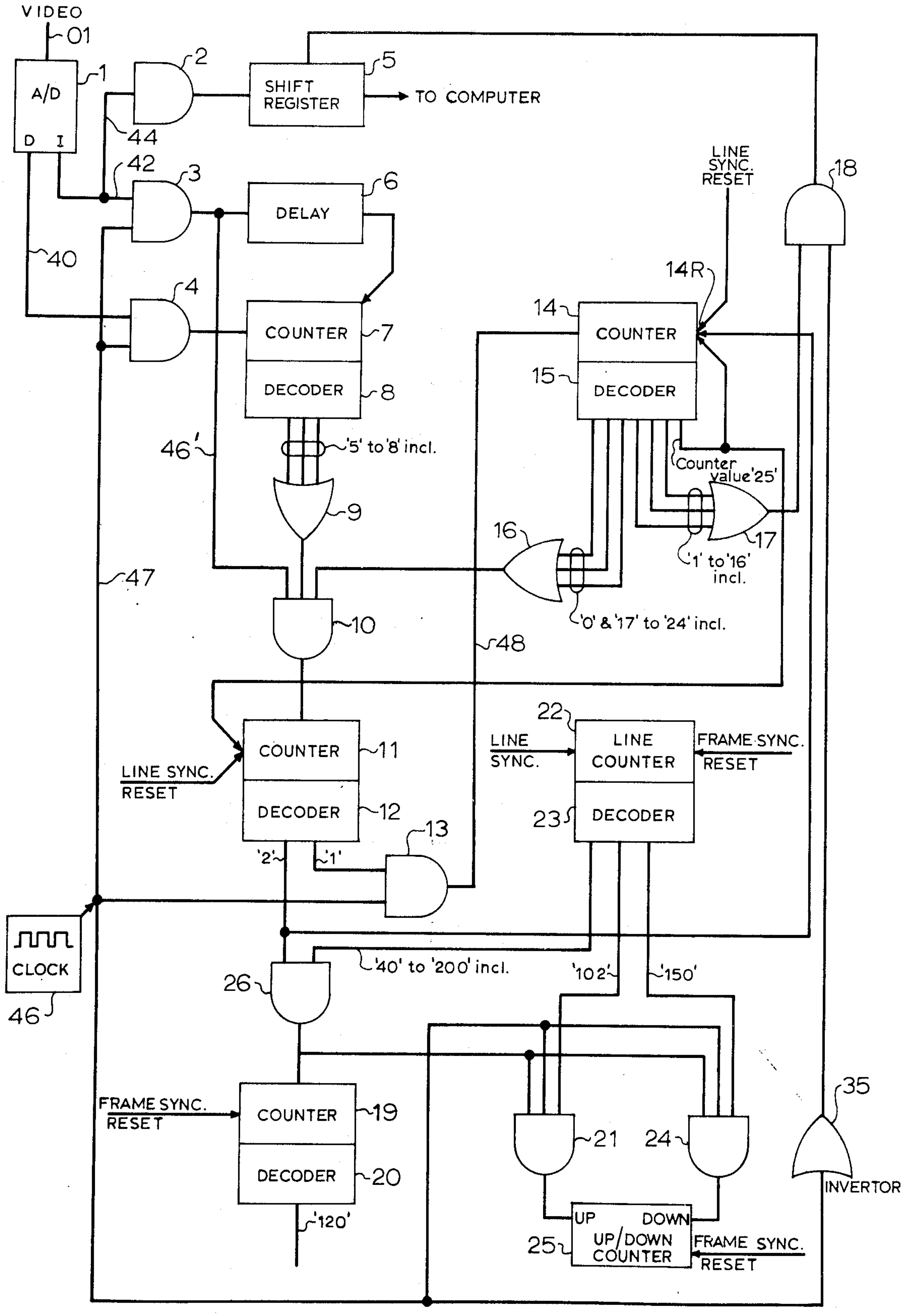
Figure 6:
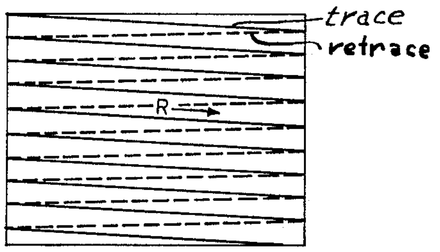
Figure 7:
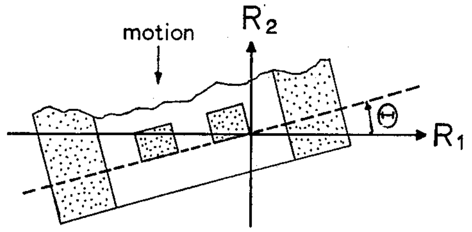
Figure 8:
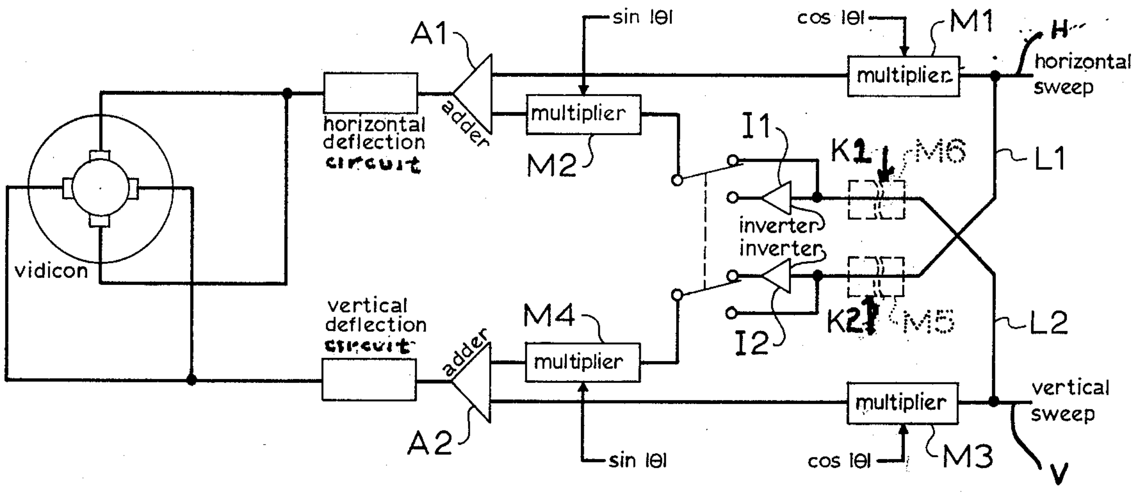
Figure 9A:
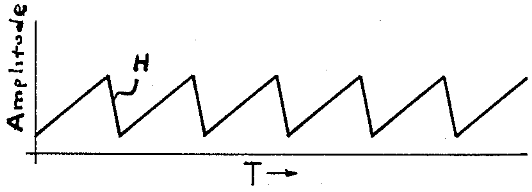

FIGS. 3(*a*) to 3(*e*) and 4(*a*) to 4(*c*) show schematic views of the output signal of the television camera scan output during the detection of the presence of the label and the extraction of the information thereon;

FIG. 5 shows the circuitry for deriving information from the television camera scan output information;

FIG. 6 shows a television camera scanning raster;

FIG. 6*a* shows a rotated raster;

FIG. 7 shows a raster scanning method in accord with the invention;

FIG. 8 shows circuitry for rotating the raster;

FIGS. 9 (a) and 9 (b) show the horizontal and vertical scan signals.

Although the invention covers the extraction of coded information from the surface of an object moving relative to the extraction means, the most common use of the invention is, at this time, thought to be, the reading of labels, containing information such as destination and contents, in coded form on parcels. It will of course be realized that, as a result of the extraction of such information, the parcels may be automatically sorted and routed, and inventory and shipping records automatically compiled.

Figure 2:
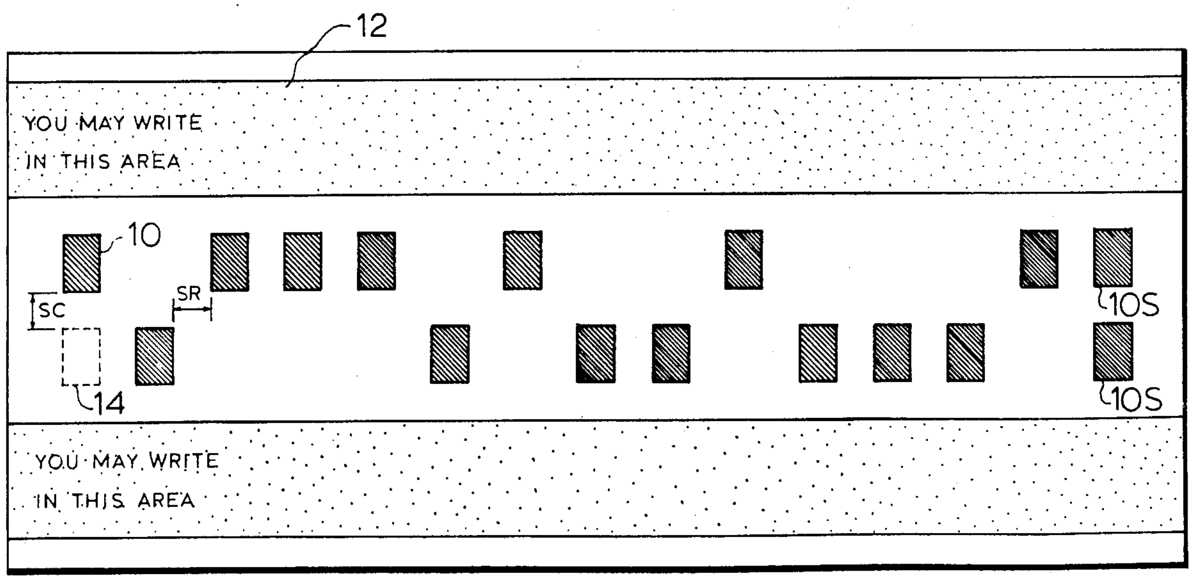
FIG. 2 shows a suggested label for use in accord wtih the invention.

A label suitable for use with the preferred embodiment of the invention is shown in FIG. 2.

The label as shown provides information defining areas 10 bordered on two opposite sides by thick parallel orientation stripes 12, also known herein as location marks between which the information is arranged so that it may be scanned perpendicular to the parallel lines. In order that ordinary language text may appear on the surface (as shown) without causing confusion with the coded information, the two stripes 12 are preferably made a color other than black or dark blue, (the preferred color for any plain language) and the stripes 12 of a selected lighter color (say red) will contrast with any plain language writing for the reader. Although provision is thus made for the writing of plain language, if desired, the reading of such plain language forms no part of this invention. When the encoded information is to be scanned, the surface is illuminated with a color (here green or cyan) complementary to the bar coloring, so that the bars, as well as the encoded information, appear dark in contrast to the background (and hence render the plain language invisible to the TV camera). The method of decoding the information involves detecting the contrast between the coded information and the background. Since the scan will include not only the label but a portion of the surface on which the label is placed and a portion of the conveyor, these portions will preferably contrast with the marks. However, the logic circuitry for detection of the information on the label will achieve such detection in almost all cases whether or not such surface and conveyor contrast with the marks. If desired, for any reason, and noting the comments regarding the parcel and conveyor, it will be appreciated that the surface, coding and illumination could be selected, so that the background is dark and the encoded information light. The information, preferably in binary form, is conveyed by bars 10 present or not in a specific location, here in columns separated by the dimension $S_C$ and rows by the dimension $S_R$. The red colored bars may be replaced by black in applications where no plain language need appear. The terminology 'row' and 'column' is selected in relation to the scan of the image of the label in the television camera, which will take place (if the label is arranged within the required angular tolerance) with individual scan lines transverse to the location bars in FIG. 2 with successive scan lines successively displaced from left to right or from right to left in the figure.

In the label shown, a binary code is shown, wherein rows of locations in pairs, disposed from one another transversely relative to the longitudinal extension direction of the bars, i.e. such as 10 and 14, either have an information bar in one location or an information bar in the other, except in the start locations 10S, where two bars appear. Thus a simple parity check is provided at all locations but the start position. If, in normal coding position, rows (extending vertically in FIG. 2) having two marks (other than in the start position) or having no marks, then in accord with well known techniques an error in encoding may be detected. Although only 14 coding positions (plus the start positions) are shown, this is for ease of illustration. It will be obvious that any number of coding positions may be provided, limited only by the size of the label. Further, although only one data and one data parity column are shown, it will be obvious that as many data columns as desired may be used (preferably combined with a data parity line) limited only by the width of the label. The rectangular shape of the bars selected is not essential but is preferable in view of the rectilinear nature of the television scan detection means, and also demonstrates that the label information may be physically produced by a standard bar printer, printing the output of a computer.

Figure 1:
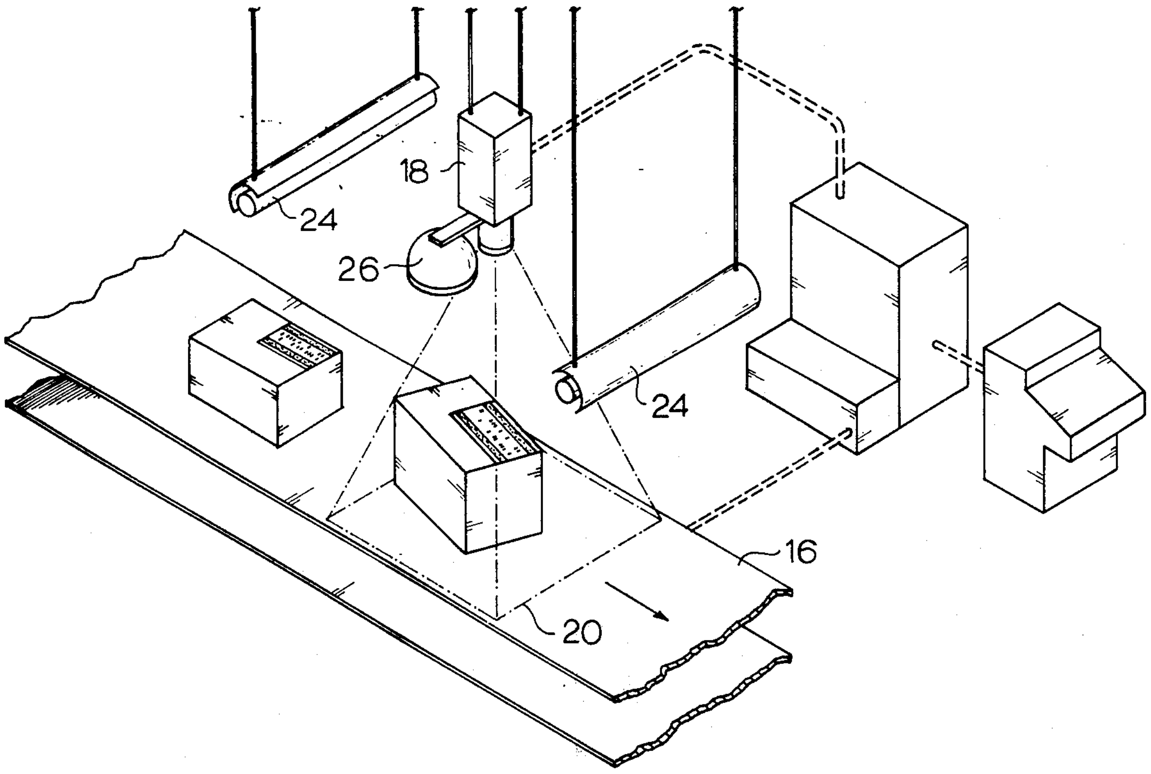
FIG. 1 shows a schematic view of parcels bearing encoded labels in use with the television equipment.

FIG. 1 shows a conveyor 16 with a series of packages thereon, and it will be noted that these are arranged at random with regard to the orientation of the stripes 12 relative to the viewing of the camera 18 to be described hereinafter.(In certain instances, two cameras will be used, focussed on the same or on adjacent areas of the conveyor path). While the application Ser. No. 276,362 filed July 31, 1972 dealt with reading only labels oriented within predetermined angular limits about the viewing axis, this application discloses means whereby labels oriented up to 360° about the viewing axis may be read. Herein, as in the previous application, (limits designed for practical purposes of simplicity of logic design) are set on the angles of pitch and roll of the label (deviations of the label from a plane perpendicular to the viewing axis about axes respectively perpendicular and parallel to the travel direction of the conveyor). Suitable limits in this regard are ±15° for pitch and ±30° for roll.

A television camera 18 is arranged to have a viewing area on the conveyor indicated by the dotted area 20 and a viewing axis preferably perpendicular to the plane of the conveyor. For simplicity the television camera 18 is shown as vertically disposed over the horizontal conveyor with its viewing axis disposed vertically theretowards. However, it will in practice often be found more convenient to locate a 45° mirror over the conveyor to direct the vertical rays from the label and conveyor at a 90° angle to a horizontally disposed camera. In any event, the camera is disposed so that the direction of its scan lines may be measured relative to a datum which bears a predetermined relationship to the conveyor travel direction.

The camera in accord with the invention will be designed to scan in the conventional raster pattern as indicated in FIG. 6. FIG. 6 is, as will be appreciated, simplified for illustration purposes as there might be something of the order of 262 lines in each field. (Typical cameras will provide interlaced scanning with two fields comprising a complete frame). In this invention however, the scanning does not provide the basis for a picture but the results of scanning are analyzed from the video output signal. Accordingly, if the camera used in the processes of the invention uses interlaced scanning, each field may be considered as a separate unit.

In discussing the orientation of the raster, its direction (indicated by the vector R in FIG. 6 and perpendicular rasters by the vectors $R_1$, $R_2$ in FIG. 7) will arbitrarily be assigned as the direction of the trace lines of the scan, i.e. those which are sensed as distinct from the retrace lines which are blanked out in the scan output signal.

It is one of the principal features of the invention herein described, that the scanning raster of the television camera may be rotated to scan randomly oriented coded information at a consistent angle.

Although the means for detecting the random angle which the coded information assumes in the camera image will be described hereafter, the means and method for rotating the television scan will now be discussed.

The scan as shown in FIG. 6 results as is well known from conventional TV camera design from the combination of a saw tooth signal H for controlling (in convential cameras) the horizontal deflection (such signal being commonly known as the horizontal sweep) of the scanning beam with a saw tooth vertical signal. The rightward rising portion of the horizontal signal H (FIG. 9*a*) corresponds to the scanning trace when the camera image scanned thereby is reproduced in the video scan output signal.

The rightward, sharply falling portion of the saw tooth (FIG. 9a) represents the retrace position (dotted in FIG. 6) which is blacked out in the television scan output signal.

Figure 9B:
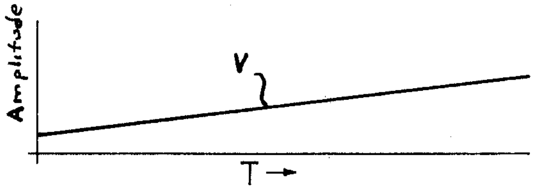

Although the vertical deflection signal V is also a saw tooth, it represents, during a single field, a signal, uniformly increasing with time and is so portrayed on FIG. 9(b).

The deflection forces controlling the direction of the scan during the duration of a single scan line are therefore a horizontal vector H uniformly increasing with time and the vertical vector V uniformly increasing with time and producing the resultant vector R, which also represents the raster direction of FIG. 6.

The signals represented by the vectors H and V are provided by the circuitry of the television camera referred to as Horizontal Sweep and Vertical Sweep signals respectively are conventially supplied to the Horizontal and Vertical, respectively, deflection circuits. These connections are altered at least part of the time, in accord with the invention.

Most elements and circuitry of the television camera are not disclosed or discussed herein as these are well known and conventional.

It may be shown that the rotation of the resultant R or the raster through an angle $\theta$ may be achieved by applying in lieu of the horizontal and vertical sweep signals, the signals $$H' = H\cos\theta \pm K_1 V \sin\theta$$
$$V' = V\cos\theta \pm K_2 H \sin\theta$$

where

H is the horizontal sweep signal supplied by the conventional camera circuitry.

V is the vertical sweep signal supplied by the conventional camera circuitry .

H′ and V′ are the modified signals supplied for actuation of the Horizontal and Vertical deflection circuitry respectively.

$\theta$ is the absolute value of the raster or resultant rotation angle.

The upper value for the sign of the second term, in each case represents counterclockwise rotation, while the lower value in each case, represents clockwise rotation. (It will be obvious that the conventions could be altered by having $+\theta$ represent counterclockwise rotation and $-\theta$ clockwise and using only the upper of the two signs in each case — however the convention set out in the equations above, represents more closely the preferred circuitry which requires selectively applied inverters to represent the change of sign.

As stated, the method of detecting the angle of the information pattern to the scan will now be described.

In FIG. 8, about to be discussed the horizontal and vertical deflection circuits may involve more components than those shown. Such components are well known (in each case usually include an amplifier) and are here represented in block form.

As shown in FIG. 8 the Horizontal sweep signal, instead of being directly applied to the Horizontal deflection circuitry as in conventional circuits is applied to multiplier M1 and to Line L1. The signal on line L1, by means of a two position switch is alternatively connectible through an invertor 12 or directly to a multiplier M4. Multiplication at multiplier M1 is by cos $\theta$ and M4 by sin $\theta$.

The vertical sweep signal is applied to the input of multiplier M3 and to line L2. The signal on line L2, by means of a two-position switch is alternatively connectible through an invertor 11 or directly to a multiplier M2. Multiplication at multiplier M3 is by cos $\theta$ and at multiplier M2 by sin $\theta$.

The switches to determine each of the invertors — direct line choices are shown as ganged and for counterclockwise $\theta$ will be in the upper position.

Although these switches are shown schematically, the switches will preferably be of the electronic, solid state type in order to provide rapid switching action.

The output of multipliers M1 and M2 is added at adder A1 and the summed output supplied to the horizontal deflection. The output of multipliers M3 and M4 is added at adder A2 and the summed output supplied to the vertical deflection circuit.

The above described circuitry is effective to produce the desired scan rotation through an angle $\theta$ if the wiring of the horizontal and vertical deflection means, and the horizontal and vertical sweep signals are such that (a) the horizontal sweep signal causes equal vertical deflection when applied either to the vertical or horizontal deflection circuits and (b) if the vertical sweep signal likewise has the same deflection effect whether applied to the vertical or the horizontal deflection circuit.

It will be obvious from the circuit, that in this event, the output of the adder A1 to the horizontal deflection circuit will be H cos $\theta \pm$ V sin $\theta$ and the output of the adder A2 to the vertical deflection circuit will be V cos $\theta \mp$ H sin $\theta$, the upper and lower signs in each term representing the upper and lower positions respectively of the ganged switches and counterclockwise and clockwise respectively.

It will be noted that most cameras are not equivalently designed in their horizontal and vertical deflection circuits, i.e. a signal having a given deflection effect when applied to the horizontal deflection circuit would have a different deflection effect when applied to the vertical deflection circuit.

Since the relationship between deflection and signal amplitude would be linear in each case the difference may be compensated for by increasing or decreasing the signal by a constant. Reference is now made to the dotted boxes M5 and M6 in FIG. 8. These represent multipliers by K1 and K2 respectively. Thus K2 represents the constant by which the horizontal sweep signal H must be multiplied to produce the equivalent vertical deflection to the horizontal deflection it conventionally would have caused, while K1, conversely, represents the constant by which the vertical sweep signal V must be multiplied to produce the equivalent horizontal deflection to the vertical deflection it conventionally would have caused. The vertical arrow to each multiplier M2 and M6 represents the terminal at which the indicated multiplying factor is applied.

Thus with the multipliers M5, M6 in the circuit the equation becomes:

Signal to Horizontal Deflection Circuit $H \cos \theta \pm K_1 V \sin \theta$

Signal to Vertical Deflection Circuit $V \cos \theta \mp K_2 H \sin \theta$

The result is rotation of the raster counterclockwise for the upper signs in the terms and clockwise for the lower signs through an angle $\theta$.

This is the situation with the preferred form of camera (the vidicon) for use with the invention. However, it has been found convenient and is the preferred method to use a vidicon camera built to provide equal deflection effects in response to vertical or horizontal signals. In this event of course K1 and K2 become 1 and the multipliers M5 and M6 need not be used in the circuit. The preferred circuit therefore does not use M5 and M6.

In general any television camera may be used although the equal deflection vidicon is preferred. If intermittent illumination of the camera is used the camera must of course be of the type to retain the image from the time of illumination to the time of scanning.

In the operation of this part of the circuit therefore, labels randomly disposed are preferably initially scanned in the normal orientation, thus $\theta$ is zero degrees and the factors applied to the multipliers are cos $\theta = 1$ and sin $\theta = 0$ and the Horizontal and Vertical sweep signals are H and V as if the novel circuitry were not included. When, as discussed hereinafter the orientation of the pattern is determined and hence the necessary rotation $\theta$ of the raster in order to scan it the multipliers are then actuated to cause multiplication by the amounts cos $\theta$ and sin $\theta$ as indicated. The invertors are also switched to create the desired sign for rotation in the proper sense.

Although little has been said about the flyback or retrace of the horizontal and the vertical saw tooth scan, the actuation to cause rotation of the raster also causes rotation of horizontal and vertical retrace in the right direction and of the right amount.

Raster rotations of greater than 90° cause complications in the logic required for switching and in fact logic and control requirements are simpler if raster rotations are maintained at less than 45°. An information pattern is used so that the information direction is known, so that it may, in fact, be scanned in either direction. As will be appreciated, being able to scan from either direction reduces the maximum rotation $\theta$ to not more than 90°. The maximum rotation $\theta$ may be reduced to not more than 45° by initially scanning the label with two rasters at 90° to each other, as indicated in FIG. 7. The raster may then be selected which is at less than 45° (or one of the rasters at 45° if the information scanning direction is located at exactly 45° to each raster) and rotated through the angle $\theta$ with required sense to allow scanning of the information, again as hereinafter discussed.

The provision of two scans at 90° to each other, may be achieved either by providing two cameras each initially scanning at 90° to the other. The angle of each raster to the pattern is then detected, as hereinafter discussed, and the raster requiring the smaller amount of rotation is rotated to align the raster with the desired pattern scanning direction.

As an alternative to the provision of two cameras, a single camera may be used to scan alternately in rasters at 90° to each other using the circuitry of FIG. 8. Thus on alternate scans $\theta$ is made 0 whereby the signals H and V are applied to the horizontal and vertical deflection amplifiers respectively ($\cos \theta = 1$ $\sin \theta = 0$) as previously noted. On the other alternate scans $\theta$ is made 90° so that $\cos \theta = 0$ $\sin \theta = 1$ and the signal H is applied to the vertical deflection plates while V is applied to the horizontal deflection plates. This effects a rotation of the raster through 90°. It will be appreciated that control of the invertor may be used to determine the sense of the 90° angle between the scans. If the labels may be oriented at any angle in a 360° range and read in either direction the sense of the 90° angle will not be of major important. With the rasters scanning alternately, the orientation of the pattern to each raster is detected, as hereinafter described and a raster requiring 45° or less rotation is then rotated, in accord with the operation of the circuitry of FIG. 8.

In preference to alternating rotation of the scan signals through alternation of the sine $\theta$ and cose $\theta$ multipliers, however, it is preferred to achieve the initial 90° rotations by leaving the value of $|\theta|$ in the circuit of FIG. 8 at 0 and alternately interchanging the signals applied to the horizontal and vertical sweep terminals with suitable alteration in saw tooth frequency and scale.

Although the circuitry of FIG. 8 modifying the conventionally supplied horizontal and vertical sweep signals, is the preferred method of rotating the scan, it will be understood that the generation of the necessary signals for the rotated scan may instead (and within the scope of the invention) be generated within the means for producing the horizontal and vertical sweep signals themselves, by techniques of signal production and shaping well known to those skilled in the art.

On the basis of the discussion it will be noted that following the directions of the preferred embodiment without further modification, not only will the scan of the type indicated in FIG. 6 be rotated, but the rectangular raster shape will also be rotated. It may be desired to rotate the scan while leaving the shape of the pattern unchanged, i.e. a rotation of 90° of the pattern of FIG. 6 might be desired, while leaving the over-all raster rectangle or 'envelope' oriented as before. In this event it will be obvious that the trace and retrace lines must be shorter in travel but greater in number as illustrated in FIG. 6*a* to produce the raster direction $R^1$ with the same line density while the vertical signal will have to be increased in slope to produce the same line spacing. Modifications of the signal to produce rotations of the raster scan of less (or more) than 90° while leaving the envelope oriented as before are more complex but well within well known techniques of those skilled in the art. This is in addition to the preferred scan rotation techniques shown and the alternative techniques discussed it will be understood that modification of the horizontal and vertical sweep signals either within the circuitry shown or without is within the scope of the invention.

In general the value H and V of the horizontal and vertical sweep signals may be altered between their values before and after scan rotation to produce such dimensional changes in raster dimensions and raster line density as are required. Such changes will therefore take place at approximately the time of rotation of the scan. Thus H and V are not necessarily constant quantities where circuitry such as that of FIG. 8 is used but may bear different values before and after rotation.

In accord with preferred embodiment of the invention, the viewing area of the camera or cameras 18 on the conveyor, is intermittently illuminated by a strobe light 26 (i.e. light which may be turned on for a short controlled period and then turned off). In order to allow the use of the red strip 12 as writing locations but to have these strips contrast with the background, the label is illuminated with green light so that the black marks 10 and the red marks 12 both give sufficient contrast to the camera. It will be appreciated, for the purpose of decoding the information, that although it is more convenient to have the information marks within the standard range of color of a bar printer, it is possible in general, for both the information and the location marks, to use any color; which in the illumination provided, will contrast with the background of the label.

The television camera, as is well known, scans the image formed therein, to provide an electrical current output (known herein as a 'video scan output signal' or a 'scan output signal') wherein dark and light areas scanned in each line produce signals of high and low amplitude. (If desired, equally available within the known techniques in the art and equally useful within the scope of the invention, the video scan output may be provided, for processing by the invention herein described, in the form of a larger amplitude signal for the bright areas scanned and smaller for the dark). As is well known, the scanning progresses line by line down a field with the video scan portraying the scanned results of each trace line serially from the top to the bottom of the field with the scan signals for each line separated by the retrace which does not appear in the scan output and is comtemporaneous with the line synchronization pulses, and so on from one field to the next, with the fields separated by synchronization pulses known as 'frame sync pulses'. As is well known, the television camera conventionally scans, in one field every second line of those required to completely scan the image, and then scans the omitted lines in the next field. However, for the purposes of the invention, each field may be considered as a complete scan of the image, separated by frame synchronization pulses.

The detection of information received through the line by line scan of a moving image or label places limitations on how close the information marks may be, placed and/or how fast the label may travel, since the label may travel a material distance during the scanning of a single frame and will cause ambiguity in information marks too closely spaced, having regard to the speed of the conveyor. Therefore it is preferred to limit the illumination entering the camera to produce the image, to a short enough interval that the moving information marks cannot move sufficiently, or be sufficiently blurred, to be ambiguous. The most suitable timing for such illumination to occur, is during the frame sync pulse and the interval of said illumination is therefore made the approximate interval of such pulse. It will be appreciated however, that the length and occurrence of the short-time illumination may be varied to suit specific situations and that, once the scan has located the location marks in the desired position for scanning the information, the short-time illumination (here sometimes referred to as 'strobing') takes place at a time relative to the frame scan, so that the information may be completely scanned between such strobing.

Thus although the invention applies to the use of a television camera with deflection and interpretation equipment as described, with continuous illumination during the location of the pattern and the reading of the information, it is highly preferable to use strobed illumination for the reading of the information and preferable in most applications to use strobed illumination at all times.

In the logic circuitry reference is made to AND and OR gates. It is assumed however, that for each of such logical elements, the counterpart inverse logical element may be substituted with due attention to the sense of the input and output signals required for each stage. Thus where an AND gate is referred to, the gate is of the type where enabling signals of the same sense are required at all inputs simultaneously to provide an output of predetermined sense, the outputs at all other times being of the other sense. Further, where an OR gate is referred to, the gate is of the type where an enabling signal of predetermined sense is only required at at least one input to provide an output of predetermined sense, and provides the opposite sense only when no enabling signal occurs at any of its inputs. Thus by an AND gate, I include a NAND gate which may be considered as an AND gate with an inverted output, and by an OR gate, I include a NOR gate which may be considered as on OR gate with an inverted output. In general the application does not discuss the relationship between the sense of the output signals of one stage and the required input to the following stage, it being realized that it is elementary to those skilled in the art of logic circuitry that such senses are obviously known and controllable; and that where the sense at the output of one stage is the opposite from that required at the next stage, the necessary inversion may easily be accomplished between stages.

Figures 3A, 3B, 3C, 3D, 3E, 4A, 4B, 4C:
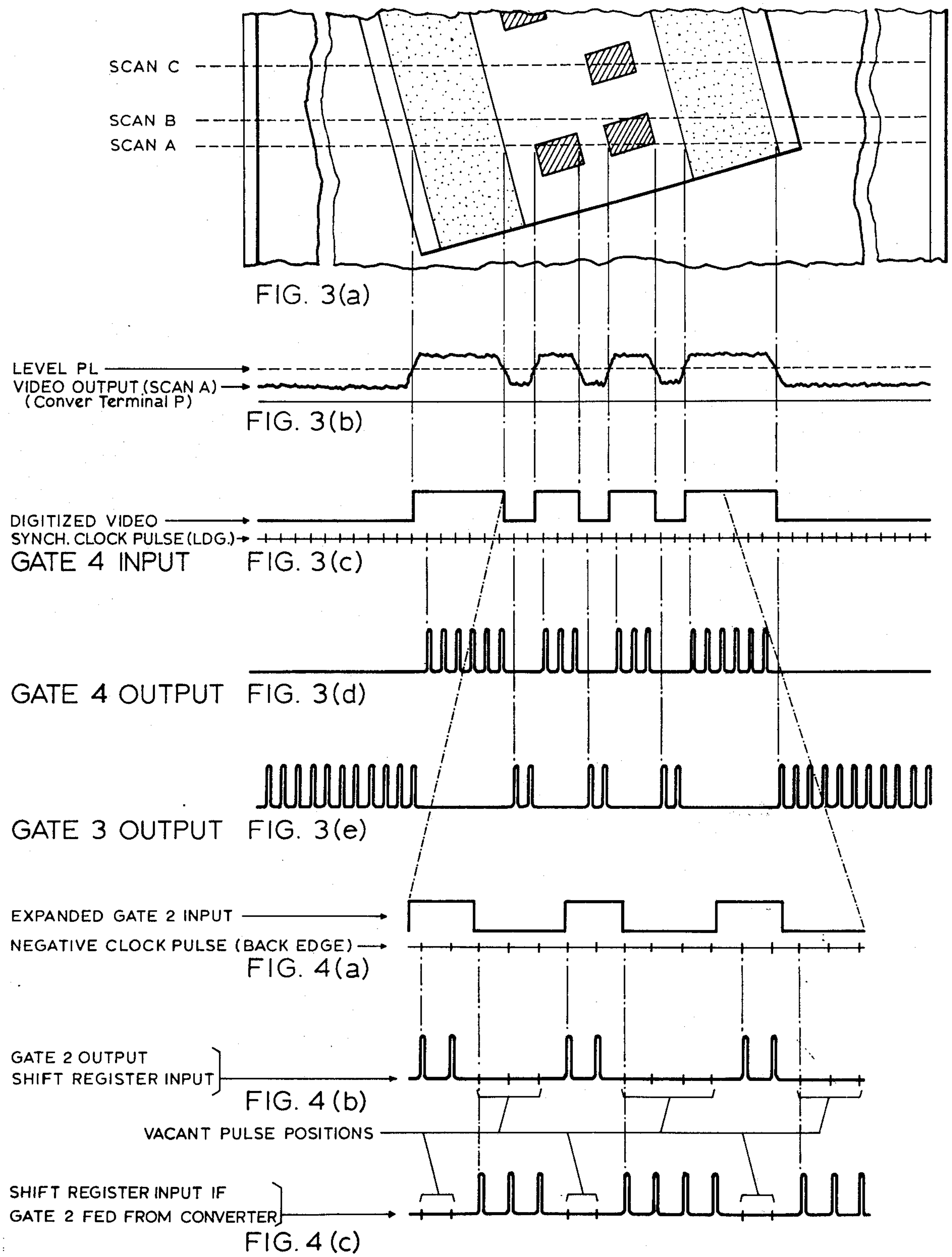

The video scan output signal of the television camera (shown in FIG. 3(b)) derived from 'scan A' of FIG. 3 (a) is provided to an analogue-to-digital converter for the signal. The convertor is designed to discriminate between levels in the video scan output signal above and below a predetermined value. The predetermined value is selected to be between the level corresponding to the scan output from scanning in the illumination provided, a location of information mark, on the one hand and the level corresponding to the scan output from scanning the background on the other hand. The discriminator is designed to provide an output which has one of two levels, as shown (FIG. 3(c)) wherein the two levels respectively correspond to video scan output signals above and below the predetermined level and the FIG. 3(c) level is switched, depending on the crossings of its analogue input with the predetermined level. The output of the convertor 1 at gate "D" where the 'dark' or information signals are of high value and the low or background signals are of low value is applied as one of the inputs to AND gate 4. The converter is so designed that a signal which is the inverse output to that of FIG. 3(c) is developed at output 'I' of the convertor and applied to ga'e 2 and AND gate 3, along lines 42 and 44.

A Clock 46 is provided to achieve synchronism in the logic circuit. The clock 46 must pulse at a rate relative to the television scan rate, and to the dimensions of the information and location bars so that by sampling the signal of FIG. 3(c) at the leading edge of each clock pulse meaningful results may be obtained evidencing the spatial relationship between the location bars and the background, and also between the information marks and the background. Since the scan rate is regular and punctuated by line and frame sync pulses, the number of clock pulses occurring between the start of a line or other position on the scan line or scan line output and a spaced location on the same scan line is a measure of distance along a scan line and a definite width (which it is convenient to refer to as a 'pulse width') defines the distance travelled by the scan during the period of the clock pulse. Where, as in the method described, the video scan output is sampled at the frequency of the clock pulse, it will be obvious that for the accurate extraction of information, the length of a ' pulse-width' must be short relative to the dimension in the scanning direction of the smallest marks to be determined, namely the information marks.

In practice, the number of pulse-widths (and this of course is directly related to location and information mark dimensions in the label design) is preferably 12 for each location bar and 24 in between. However, for ease of illustration in the drawings, only half the pulse frequency is shown, i.e. 6 clock pulses during the scanning of each location bar and 12 between and the specific embodiment is therefore described using the 6 and 12 clock pulse measures. The location marks or bars printed by a computer bar printer will have widths of approximately six pulse widths and a spacing of four pulse widths in between (three and two respectively in the example). The rising (here leading) edge of the clock pulse indicated by transverse lines on the time base (FIG. 3(c)) is used to open gate 4 to sample the output of converter 1. The results of such sampling are shown in FIG. 3(d). Shown immediately below in FIG. 3(c) is pulse output from gate 3 resulting from the inverted output from gate 1 convertor 1 gated at gate 3 by the output of clock 46.

For convenience of illustration the finite width of the clock pulse is not shown in the drawings. The clock pulse lines shown in FIG. 3 therefore represent the leading edge of the pulse while the negative clock pulse lines of FIG. 4*a* correspond to the trailing edge of the clock pulse and in the preferred embodiment trail the clock pulse by slightly more than one-half pulse period. The state of shift register 5 reflects the state of the inverse signal at gate 2, at sampling times occurring at the frequency of pulses from clock 46 but out of step therewith as hereinafter described.

FIG. 3(a) shows a portion of the image formed inside the television camera, and scan lines A, B and C following portions of FIGS. 3 and 4 are derived from scan line A in accord with the normal scan of the camera, extending thereacross. FIG. 3(b) shows the video scan output signal resulting from scan line A, television camera being conventionally but not necessarily designed to provide a high amplitude output signal for dark areas and low amplitude for light areas. The scan output signal is supplied along the line 01 to the analogue to digital convertor 1. The convertor 1 is designed, as previously explained, to discriminate between outputs along line 01 above and below a predetermined level and to provide a signal of one level when the magnitude is above the predetermined level and of another level when the magnitude is below the predetermined level. The predetermined level PL (FIG. 3(b)) is selected approximately midway between the magnitude of signal resulting from the dark information of location marks and the magnitude of the signal resulting from the bright background. The output of the convertor at terminal D is then shown in FIG. 3(c) as 'digitized video' and is provided along line 40 to AND gate 4. The analogue to digital convertor is also designed to provide at gate 1 an output which is the inverse of that shown in FIG. 3 to gates 2 and AND gate 3.

The description of the use of the analogue to digital convertor in the circuitry of FIG. 5 and the illustration of FIG. 3(b) discuss an analogue to digital convertor wherein the video scan output signal is compared with the signal level PL to derive the signal of FIG. 3(c) and its inverse. In applicant's co-pending application Ser. No. 383,285 filed 07/27/73 there are described methods of deriving the signal of FIG. 3(c) from the signal itself. The operation of the circuitry of FIG. 5 modified to include means of deriving the graph of FIG. 3(c) from the signal itself are considered within the scope of the invention.

Gate 3 and 4 also have inputs from clock output 46 and are designed to provide an output pulse created by the leading edge of the clock pulse.

The output of AND gate 4 (FIG. 3(d)) is fed to counter 7 where the pulse output is counted. The inverse pulse output of Gate 3 delayed by a convenient fraction of the clock pulse period to avoid ambiguity with incremented additions to counter 7 is used to reset counter 7. (FIG. 3(e) shows the gate 3 output without delay). Thus the counter 7 is designed and connected to count the number of each series of pulses appearing at the output of gate 4 corresponding to the scanning of a dark area and to be reset by the first pulse of a series from gate 3 indicating the beginning of a bright area scanned. The values in counter 7 are provided to decoder 8 and the decoder 8 is connected to provide decoded outputs when the pulse counts in counter 7 correspond to the range of widths of a location bar 12 and within the acceptable height range (which height determines the bar width in the image). Thus with an expected width of 6 pulses for a location bar the decoder will be designed to produce outputs at counts between 5 and 8 inclusive. When the counter 7 stands at any of these values decoder 8 provides an output on one of the four (i.e. '5', '6', '7', '8') lines to OR gate 9, producing at its output an enabling signal to AND gate 10.

AND gate 10 is also enabled by a pulse from gate 3 (signalling the end of a dark period) along line 46 and from OR gate 16 when the counter 14 stands at 0 or '17'–'24'. Since counter 14, as hereinafter explained, is only enabled to count after a location bar has been scanned, counter 14 is at 0 at the beginning of a scan line. Thus starting with scan line A, as the scan moves from left to right across the frame, gate 10 provides an output to counter 11, the first time during the scan of a line counter 7 stands at a count of 5–8 at the end of a dark area.

Thus, in response to the scan crossing location bar (within the orientation range) or dark area of corresponding width, counter 11 counts 1 and activates the '1' output of decoder 12. While the decoder 12 output is '1', AND gate 13, enabled thereby, provides pulses resulting from the leading edge clock pulses from clock 46 to counter 14 along line 48 as long as counter 11 stands at '1'.

The decoder 15 connected to counter 14 provides three types of output. Firstly, outputs corresponding to counter values of 0 and '17' to '24' are connected to OR gate 16 to provide an enabling signal to gate 10, when counter 14 stands at these values. The scan length represented by the pulse counts between 17 and 24 represents the sum of the pulse width spacing between the location bars (12–16) and the width 5–8 of the second-scanned location bar, both within the acceptable range of orientation. Secondly, decoder 15 outputs corresponding to 1 to 16 are provided to gate 17 whose output, in combination with gate 18, is designed to enable inverted clock pulses (from clock 46 and inverted by invertor 35) to pass through gate 18 when the count on counter 14 is 1–16 inclusive and to inhibit the passage of such pulses at other times. The inverted clock pulses are the pulses from clock 46 inverted at invertor 35 but remaining in synchronism therewith. Thirdly, output from decoder 15 corresponding to a value of 25 in counter 14 is used to provide a reset signal to the reset terminal 14R of counter 14 and counter 11.

In operation then with the circuit as described this far, no signals are provided to the counter 14 until a dark area (see scan line A) is scanned. If a dark area smaller than 5 pulse widths or larger than 8 pulse widths is scanned, this is counted on counter 7 but the counter is reset by the first pulse after the commencement of the pulse of gate 3 at the commencement of a bright interval and no resultant output occurs at gate 10 since the pulse at gate 3 did not occur when counter 7 stood at 5, 6, 7, or 8. Since there is no output on the decoder 12 '1' output, counter 14 remains at 0 and through decoder 15 and OR gate 17 disables gate 18 so that nothing is shifted into shift register 15. Counter 14 at 0 also provides one of the three necessary enabling signals for gate 10.

This state continues until counter 7 has 'counted' a dark area of between 5 and 9 pulse widths at the time the first pulse from gate 3 signals the passage by the scan from a dark to a light area. Then all three inputs to gate 10 are enabled. The counter 11 then counts '1' indicating that a location bar (or dark area of similar width) has been scanned. The counter 7 is of course reset after such total count of a dark area by the delayed reset pulse from gate 3.

As soon as counter 11, as described above, reached the count '1', the output of decoder 12 enables gate 13 and the resulting clock pulses to pass through gate 13 to counter 14 and are counted therein from '1' upward causing the output of decoder 15 for counts from '1'–'16' to disable gate 10 through gate 16 until at least 17 is reached in counter 14 and to enable gate 18 through gate 17 for counts from 1–16.

For counts on counter 14 from '1'–'16' the inverted clock pulse actuates the shift register 5 on the rising (trailing) side of the inverted pulse and clocks the input (FIG. 4(a)) thereto from gate 2 at intervals trailing the regular pulse output by the pulse width or approximately one-half the clock period. The shift register has 16 positions corresponding to the 16 pulse positions fed thereto during a line scan. The pattern of pulses produced from the output of gate 2 in shift register is shown in FIG. 4(b) where pulses occur in the areas between the bars, and no pulses occur during scanning the two information marks 10. Those pulses or their absence appear as binary signals (pulse or nor pulse) in successive stages of the shift register. In case it had been preferable, for the use of the computer, to provide a shift register 5 carrying record of the presence of pulses during information marks and no pulses when there are no information marks, then gate 2 could have been fed from the gate D of the analogue to digital converter 1 rather than from the inverse output, and the contents of the shift register would have been as shown in FIG. 4(c) indicating 2 information bars scanned (scan line A) between the location bars. In either event the shift register after clocking by the inverse clock pulses permitted through by gate 18 contains a series of stages containing a 'one' or 'zero' for each pulse position corresponding to a dark area and a 'zero' or space for each pulse position corresponding to a bright area or vice versa, and in either event, the record of the scan in the shift register may easily be read by the computer. It will be noted that since 16 pulses are read into the shift register and the space between the bars may be 12–16, depending on the angle of skew, that the shift register, in addition to a binary record of the information may have 1–4 stages corresponding to a portion of the second location bar. However, the location of the stages of the shift register, corresponding to the second location bar scanned makes the character of such stage easily detectable by the computer which will discriminate between an information bar and a location bar. Note also that the only information row, with two bars indicates the start of the information so that from the position of the start bars the computer may detect the correct order in which the information (which may be scanned in either orientation) is to be processed.

As will be obvious, the acceptable angle of skew and the consequent tolerance for variation in width of the bar width as scanned is variable to suit particular design requirements and depends upon the accuracy of the scan rotation performed in accord with the teaching of this invention.

When counter 14 reaches the counts of 17 and 24 inclusive, the minimum to maximum pulse width of the expected space between the bars plus the pulse width of the second location bar, has been scanned. For counts from 17–24 in counter 14, respective outputs from decoder 15 through OR gate 16 supply an enable signal to gate 10 which is also enabled by the first pulse from gate 3 signalling the transition from dark to light in the scan. If a second dark area of the width of a location bar of 5–8 pulse widths (correct tolerance) is scanned over an interval ending in counts in counter 14 between 17–24 (correct location relative to first location bar) then gate 10 enabled by simultaneous enabling outputs at gate 3, 9 and 16 and counter 11 is shifted to the count of 2. The '2' output of decoder 12 is activated to provide one enabling signal to gate 26. Signals passing gate 26 as hereinafter explained, are counted by counter 19. Counter 19 is connected to be reset at the time of the frame sync pulse (i.e. reset between frames) and, when gate 26 is enabled, counts the number of lines, in a frame, wherein the two correctly spaced location bars are detected. As with the tolerance for the number of places in shift register 5 it will be appreciated that the tolerances expressed above and at various locations in the application, dependant upon the angle of skew and hence on the tolerance for the angular rotation of the scan to read the label.

At the same time, as counter 11 moves from 1 to 2, gate 13 formerly enabled by the 1 output of decoder 12, is disabled. Counter 14 will be reset at the end of each line, by a signal derived from the line sync pulse, if it has not reached 25, or each time it reaches 25, by the '25' output of its own decoder 15.

When the counter 11 reaches '2' the pattern of information marks (or any other contrasting material) for the scan of a single line, will be recorded in shift register 5. Such pattern will not, however, in the preferred embodiment of the invention be transferred to the computer until it has been determined that the whole information label is present in the field of view of the television camera and until the direction of the scanning raster is such that the information represented by the information marks or bars scanned in the appropriate direction (within design limits of skew tolerance) to allow the information desired from the scan to be handled by the computer or other data treatment means. This is so that the computer will only receive the line by line information from the shift register when the position of the label and its orientation relative to the scan is such that the sequential scan records from shift register 5 will provide a record of the scan of a complete label. The determination of the presence of the label in the field of view is achieved by counting, per field, at counter 19, the number of lines per field in which two properly spaced location bars are detected. The location of the label at a desired position in the field of view is also determined by AND gate 26 provided between the '2' output of decoder 19 and counter 19 to prevent the initiation of counting lines with two properly spaced location bars by counter 19 until a certain frame line has been reached. Thus a line counter 22 is arranged in any desired manner to count the lines of each field (such as (as shown) by counting line sync pulses and resetting on every frame sync pulse). A decoder 23 is arranged to provide an output corresponding to the desired upper line position occupied by the label at the time of the frame scan. For example, with 262 lines to a field, assuming that a properly oriented label will encompass 155–160 lines and it may be desirable to detect the label in the upper half of the field, say between the 40th and 200th lines. The decoder 23 will therefore, be arranged to provide an output at line counts 40 to 200 (incl.) to enable gate 26 during this interval to allow the counting of lines with properly spaced location bars producing a '2' output from decoder 12. Counter 19 is connected to be reset by a signal originated by each frame sync pulse. Between such reset signals counter 19 counts the lines with correctly spaced double bars starting with line 40. Decoder 20 is designed to provide an output with the minimum number of good lines for the label being in the correct position has been detected, in this example 120 lines. The '120' output of decoder 20 is used to signal the computer, that the shift register 5 will contain information about a correctly positioned label in the scan lines of the next field. A separate indication to the computer will be provided to inform it that any necessary scan rotation has taken place. If the computer is so programmed, the computer will on notification of a correctly positioned label and of the completion of any scan rotation store and process the successive line records in the shift register resulting from scanning between the location bars, on the next field. From the read-out of the shift register the computer may decode the encoded information.

The use of 120 lines to indicate the presence of a label whose bars encompass 160 lines is determined by the fact that it has been found that such determination will ensure that in substantially all cases the complete label will be in the next field scanned. Thus the '120' count between lines 40 and 200 may indicate that some lines have not been counted due to noise in the scan signal or that part of the label is above line 40 although within the field with 120 lines between lines 40 and 200. In either event the detection of 120 lines will indicate in a high enough percentage of cases for efficient operation, that the next field may be used to extract the information. Obviously the number 120 will vary with the illumination, the camera and other parameters. Given the occurence of a '2' output (or other locations identification signal) from decoder 12 or equivalent device, combined with an ability to count the number of scan lines down a field, there are many alternative counting or logical arrangements to deduce the correct positioning of the label. However, such alternative arrangements will be dependent on ability to recognize that two location bars (or other arrangement of location bars) has been detected in a scan line.

The counters herein are reset as follows:

Counter 7 from delay 6

Counter 11 at each line sync pulse and each count of '25' from decoder 15

Counter 19 at each frame sync pulse

Counter 14 at each line sync pulse at each count of '2' from decoder 12 at each count of '25' from decoder 15

Counter 22 at each frame sync pulse

Counter 25 at each frame sync pulse

The feeding of the information to the computer with a continuously repeating scan of a moving image places limitations on how close the information marks may be placed and/or how fast the label may travel, since the label may travel a material distance during the scanning The short interval illumination may be achieved in various ways. The regular green illumination provided here by the fluorescent lamps, may be continued while light admitted to the camera, may be restricted by a mechanical shutter or for speed, an electro-optical shutter. However, I prefer to provide a strobe light in addition to the fluorescent source, so that, on detection of the label in its correct location, the fluorescent light may be switched off and the strobe light turned on and off during the frame sync interval. The strobe light may be any light source which may be switched on and off quickly enough to provide the interval within the desired tolerance and which will provide sufficient illumination to create a sufficiently bright image for scanning. If red or other non-black stripes are used it may benecessary to use a complementary color for the strobe usually by placing a colored filter in front of a conventional strobe.

The computer will be programmed to detect the output of decoder 20 and responsive thereto to cause a series of contents for the shift register to be fed in one of the pulse forms shown, to the computer. Thus the operation of the circuitry shown in FIG. 5 is the same when the operation is performed by a continuous scan.

It will be appreciated that the speed and reaction time of the circuitry and computer software may be sufficiently fast that there will, in some design alternatives, be the chance that the same label, scanned to extract the information, be again detected in the correct location and the information again scanned. This may be avoided by sufficient spacing of the labels bearing parcels on the conveyor (which may be assisted by making the conveyor of the tray-type or of some other divided type with one label bearing parcel to be placed per division. Without restriction of the parcel location the logic circuitry may be augmented to avoid scanning the same parcel, by requiring that there be detected the absence of the required number of double bar lines in the scanning range (here between frame lines 100 and 160) between one acceptance of information by the computer and the next.

There will now be described, the mechanism for detecting skew or the deflection of the label about an axis parallel to the viewing direction of the camera.

In accord with the invention described herein the skew measurement is used to determine the angle through which the raster scan must be rotated in order to provide a raster scan which is parallel (with acceptance tolerance) to the desired direction for scanning the information.

It will be obvious that the angle of skew may be determined by counting for two trace lines in a raster of known spacing the number of clock pulses that occur between a reference point and a location stripe and vice versa. The reference point is preferably the beginning or end of a scan line. The preferred method for determining skew therefore is (for two spaced scan lines) to count the number of clock pulses that occur in the time that the scan moves from the end of the location bar to the end of the scan line. The difference between the counts for two different lines is a measure of the 'skew' or the angle $\theta$ between the scan lines and the desired direction for reading the information (here perpendicular to the location stripes).

Thus it will be obvious that $$\text{Tan}\ \theta = \frac{K.\Delta Y}{\Delta X}$$

Where $\theta$ is the angle of skew $\Delta Y$ is the number of lines between the two lines selected for measurement.

$\Delta X$ is the difference in clock counts on the two lines

K is a constant selected to compensate for any scale differences between X and Y.

The method of the invention involves maintaining $\Delta Y$, — the number of lines between the two lines selected for measurement, constant preferably by making the counts whose difference results in $\Delta X$ on the same lines each time.

Thus $\Delta X$ is proportional to tan $\theta$ and this value fed to the computer, programmed for this purpose will allow $\theta$ to be determined, and the sign of $\Delta X$ will indicate the direction of the required angular rotation. As will be appreciated the computer may readily be programmed to provide from the sign and value of $\Delta X$ provided, the settings sin $\theta$ and cos $\theta$ for the multipliers and the setting of the ganged invertor switches to produce the desired camera rotation.

The preferred method of calculation of the skew of the label will now be described. The skew angle 5A is shown in FIG. 3. The skew measurement involves the use of a line counter 22. The line counter is connected to count signals originating with the line sync pulse and is reset by a signal originating with the frame sync pulse. Thus, in any frame, the line counter 22 contains a count indicating the line being scanned. Two lines are selected sufficiently spaced that a good skew measurement may be obtained. These lines need not necessarily be within the information scanning area;

These lines are chosen in the position of the frame preceding that position where it is desired to scan the information for reading. Thus the lines selected might be 102 and 150. The decoder 23 for line counter 22 is therefore provided with outputs which enable AND gates 21 and 24 respectively at line counts 102 and 150 respectively. Each gate 21 and 24 is also enabled by the '2' output of decoder 12 through gate 26 and by the clock pulse from clock 46. The output of gate 21 is connected to the 'count-up' directional terminal of a bi-directional counter 25. The output of gate 24 is connected to the count-down directional terminal in counter 25. The counter 24 is reset at the end of each frame. Thus, when the 102nd line is encountered, counter 21 is enabled after the output of decoder 12 reaches the '2' output, signalling the end of the second bar. The clock pulses passing gate 21 cause counter 25 to count up and supply at the end of the scan line a measure of the distance from the second location bar to the scan edge. The clock pulses are stopped at the end of the 102nd scan line, by the disabling of the lead from decoder 23. When the count in counter 22 reaches 150 for the 150th scan line, gate 24 is enabled and on the enabling of '2' line from the decoder 12, the pulses are counted down by counter 25 to the end of the 150th line. The count remaining in the twoway counter after the end of the 150th line is a measure of the slope or 'skew' of the label i.e. the angle between the then existent scanning direction 'R' of FIG. 6 and the desired scanning direction; which, with the label shown is perpendicular to the location stripes. The sign of the count indicates the sense of the slope i.e. a positive residual count indicates a slope as shown in FIG. 3, while a negative count will indicate a slope in the opposite direction. The residual contents of the two-way counter 25 after its 'count-up' and 'count-down' are therefore available for use by the computer, and may, if desired, be replaced by two separate counters, one for counting line 102 from gate 21, the other for counting line 150 from gate 24. In such alternative the information may be separately fed to the computer from the counter.

Although the embodiment described suggests the use of the same two raster lines, each time, to measure skew, it will be noted that the procedure may be modified to provide that any two raster lines (spaced by a constant number of lines) may be used once the stripe pattern has been identified.

It will readily be appreciated that the technique discussed may be adapted to the use of overlation marks of a different form to the stripes shown and parallel or at another predetermined angle to the desired scanning direction for the information.

It will readily be appreciated that the methods and principles above discussed, for determining skews may be applied to each camera of a pair arranged to initially scan at right angles to each other. Moreover these methods may also be applied where a single camera only is used and is caused to scan initially with alternate fields at right angles to each other. In the latter event the computer will be programmed to apply to the multipliers values of $\theta = 0$ and $\theta = 90°$ for alternate fields. (The values of 0 and 90 may be replaced by other pairs of values for $\theta$ differing by 90). (If the initial values of $\theta$, differing by 90°, are not in directions which are an integral multiple of 90° it will be appreciated that, while well within the scope of the invention, the necessary programming will become somewhat more complicated and inversions will be required where a rotation of the scan is carried over a direction which is an integral multiple of 90°).

It will be noted that the other limits or parcel orientations are required so that due to undue deviations from these orientations the information will not be ambiguous. Thus, pitch (rotation about an axis parallel to the conveyor but perpendicular to its motion direction) will tend in the camera image to shorten the information bars and the space between them (increasing the apparent skew) while roll, orientation of the label about the travel direction axis, will tend to narrow the apparent transverse dimensions and to decrease the apparent skew. Thickness of the parcel or other article raising the level of the information surface relative to the conveyor increases the dimensions of the information bars and the location bars in the image. All of the suggested limits will be determined for the parameters including the mode of programming the computer, the vertical scan spacing of the image in the television camera (effectively setting the resolution on the vertical dimension) and the clock pulse frequency, which effectively sets the resolution in the horizontal dimension.

The preferred embodiment refers to the provision of scanning with continuous lighting until a label is detected, correctly located, followed by the provision of a strobed or short period illuminated image for scanning the information. It will be obvious that, if desired, short interval or strobed illumination may be used for both location of the location bars as well as detection of the information.

Although location bars of specific width and spacing, and information bars of specific width and spacing are described in the specific embodiment, it will be obvious that other arrangements and dimensions of location bars may be used permitting the detection of the location and orientation of such location bars by suitably designed logic circuitry and that other shapes or dimensions of information marks may be used with obvious alteration of the logic circuitry. The information marks will be for binary systems, that is, the information is embodied in their presence or absence at specific locations.

The operation of the device in connection with the scan rotation will now be described (it being appreciated that the means and method for detecting the label presence before rotation, and the means for reading the label information after rotation, has already been described).

With the conveyor moving parcels, two scans of the labels are provided, either under the action of two cameras scanning at right angles to each other or with a single camera alternately scanning in mutually perpendicular directions. For simplicity of operation the cameras will be arranged so that the scanning rasters in all cases will, relative to their deflection means be at an angle of 0°, 90°, 180° or 270°.

The computer will be programmed to ensure that any information read from time to time into shift register 5 will not be read into the computer until after the scan has been rotated.

With the two scans at right angles to each other, either simultaneously or alternating, the results of the scan are handled by the logic circuit (two logic circuits will be used if there are two cameras) until, as previously described a label is located in the correct position in the scan image, as previously described.

With the location of the label in these cameras (or mutually perpendicular scans in one camera) the skew measurements ΔX from each camera or each mutually perpendicular scan is fed to the computer. The computer is then able to determine which of the scans is at an angle of less than 45° to the desired scanning direction R, (if both scans are at exactly 45° to the desired scanning direction the computer will be programmed to arbitrarily select one of the cameras).

The computer will then be programmed to apply the correct values of sin $\theta$ and cos $\theta$ (derived from the skew measurement), and any necessary switches of the ganged invertor switch to rotate the scan of the camera whose raster was at an angle of less than 45° (or the selected camera) to an orientation substantially parallel with the desired scanning direction, (here perpendicular to the location stripes). It will depend on the accuracy with which this rotation can be performed, whether or not skew corrections will have to be made thereafter to the results received from shift register 5 after the raster has been rotated. However experience has shown that scan rotations may be achieved within 5° of the desired value and that with resultant skew angles of less than this amount the computer can read the information without the necessity of these skew corrections.

Although two mutually perpendicular scans are preferred, it will readily be appreciated that a single scan may be used, requiring resultant raster rotation of up to 90°. Moreover scan rotations of greater than 90° may be provided with necessary inversion switching to provide the requisite sine or cosine sign changes.

When the scan has been rotated, as already described, the strobe is initiated if it has not been during the location stages.

The computer conditioned by the scan rotation then reads the information then being stored in the shift register 5 as previously described. The logic circuitry inhibiting reading of the information in shift register 5 until the correct positioning of label is determined may not be needed after the rotation if there is no concern about the label having left the correct area relative to the camera. If there is concern this logic circuitry may of course be used to disable the reading of the shift register 5 until the correct positioning has been assured.

With the scan rotated and the label correctly positioned the results of scanning the information bars are sequentially supplied to the shift register 5 and sequentially read out by the computer, as previously discussed. As shown and discussed the label is coded here by two bars, to indicate the direction of the information.

Thus the information may be scanned in either direction and the correct sequence determined at the computer. Obviously if more desirable in a particular application, the computer can be programmed to determine that the scan is from end to beginning relative to the information and scan in the opposite direction.

We claim:

1. In a method of extracting information encoded on a surface, movable along a locus relative to a television camera, wherein location marks indicating orientation contrast with said background, providing a television camera constructed and designed to scan the image formed therein, in a raster with a predetermined orientation, said television camera being designed to provide a video scan output signal and being designed to scan in accord with horizontal and vertical deflection signals, moving said surface along a locus through the field of view of said camera, causing said camera to alternately scan in rasters whose orientations are more nearly perpendicular than parallel, analyzing the video output signal resulting from said alternating rasters to obtain a measure of the angle of said location marks relative to each raster.

2. In a method of extracting information encoded on a surface, movable along a locus relative to a television camera, wherein location marks indicating orientation, contrast with said background, providing a pair of television cameras each designed to scan the image formed therein in a raster with an orientation differing from the other by more than 45°, moving said surface along a locus through the field of view of said cameras.

causing each said camera to scan the image formed therein, analyzing the video output signal resulting from each camera to obtain in each case a measure of the angle of said location marks relative to each raster.

3. Means for detecting information encoded on a surface movable in a locus relative to a television camera wherein the information is identified, said information having a desired scanning direction and located by the presence or absence of marks of predetermined dimension and in predetermined orientation, contrasting with a background, comprising in combination:

a television camera arranged to have a field of view including a portion of the locus of said surface, said camera being designed and constructed to produce an image and to scan said image in a raster, said camera having horizontal and vertical deflection means, and means for receiving horizontal and vertical scan signals to cause raster scanning and means for supplying these signals to the respective deflection means;

means for receiving the scan output of said television camera, and producing therefrom, at predetermined intervals during the scanning of a line along said image, a binary signal whose level is determined by whether the scan output signal is characteristic of the result of scanning said marks or of the result of scanning said background, wherein said intervals are small relative to the time to scan one of said location marks, means for analyzing said binary signals and determining the angle between said raster and said location marks, means for modifying the horizontal and vertical deflection signals before application to said deflection plates, to provide rotation of said raster to provide said desired direction of scanning.

4. In a method of extracting information encoded on a surface movable along a locus relative to a television camera, wherein the information is conveyed by the presence or absence of information marks contrasting with a background, wherein location marks of predetermined dimensions indicating the location and orientation of said information marks, contrast with said back ground.

providing a television camera, constructed and designed to scan the image formed therein in a raster with a predetermined orientation, said television camera being designed to provide a video scan output signal and being designed to scan in accord with horizontal and vertical deflection signals, moving said surface along a locus through the field of view of said camera, obtaining the scan output signal resulting from scanning such image, discriminating in the scan output signal between signals characteristic of said light contrasting areas and characteristic said background, providing at predetermined time spaced intervals a signal dependent upon whether the scan output signal is then characteristic of said area or said background, wherein said intervals are small relative to the time to scan one of said location marks, determining from said dependent signal the orientation of said location marks relative to the orientation and horizontal deflection means to provide orientation of said raster into a predetermined orientation relative to said deflection coils.

5. Means for detecting information encoded on a surface movable in a locus relative to a television camera, wherein the information is conveyed by the presence or absence of information marks contrasting with a background, in the illumination provided for forming an image in said television camera, wherein location marks of predetermined dimensions indicating the location and orientation of said information marks also contrast with said background, the combination comprising:

two television cameras arranged to have a field of view including a portion of the locus of said surface, said camera being designed and constructed to produce an image and to scan said image in a raster, said camera having horizontal and vertical deflection means, said camera being designed and constructed to scan in accord with said raster in response to suitable energization of said horizontal and vertical deflection means means for determining at a plurality of predetermined regularly time-spaced intervals, whether the scan output of said camera is characteristic of such marks or characteristic of said background, wherein said intervals are small relative to the time to scan one of said location marks, means for obtaining said determinations a measure of the angle between said raster and of said orientation marks, and means responsive to the measure of said angle, to modify vertical and horizontal deflection signals supplied to said deflection means, to produce rotation of said scan to the desired angle between said raster and said marks.

6. A device as claimed in claim 5 combined with means, subsequent to said rotation, for analyzing the video scan output obtained from the rotated scan.

7. Means for scanning of a pattern movable relative to and through the field of view of a television camera wherein the pattern includes a portion having marks of predetermined dimensions and of predetermined relative orientation and spacing, contrasting with a background, and where said pattern is arranged to be scanned in a predetermined orientation, comprising in combination, a television camera arranged to have a field of view including a portion of the locus of said movable pattern, said camera having horizontal and vertical deflection means, and means for receiving horizontal and vertical scan signals to cause raster scanning, means for supplying said horizontal and vertical scan signals to cause alternate scanning of the camera image in two rasters whose directions are perpendicular to each other, means for receiving the scan output of each direction of raster and producing at a plurality of predetermined intervals per line of said scan, a signal having one of two levels determined by whether said scan signal is of a level characteristic of said marks or of a level characteristic of said background, wherein said intervals are small relative to the time to scan one of said location marks, means for analyzing said two level signal resulting from each orientation of raster to identify the intersection of a scan line with the pattern, and means for determining over at least two predetermined scan lines the angle between said pattern and/said each raster, means responsive to the determination of the angles between said pattern and said raster, for providing another of said rasters by providing new signals to the horizontal and vertical deflection means.

8. Means as claimed in claim 7 comprising means, subsequent to said rotation for analyzing said two level signal to detect the information in said pattern.

9. Means for scanning a pattern movable relative to and through the fields movable relative to and through the field of view of a pair of television cameras wherein the pattern includes a portion having marks of predetermined dimensions and of predetermined relative overlation and spacing, contrasting with a background, and where said pattern is arranged to be scanned in a predetermined orientation, comprising a combination a pair of television cameras each arranged to have a field of view including a portion of the locus of said movable pattern, each said camera having horizontal and vertical deflection means, and means for receiving horizontal and vertical scan signals to cause raster scanning, said cameras being arranged to scan said pattern rasters directed approximately perpendicular to one another, means for receiving the scan output of each camera and producing at a plurality of predetermined intervals per line of said scan, a signal having one of two levels determined by whether said scan signal is of a level characteristic of said marks or of a level characteristic of said background, wherein said intervals are small relative to the time to scan one of said location marks, means for analyzing the two level signal resulting from each camera to identify the intersection of a scan line with the pattern, and means for determining over at least two scan lines the angle between said pattern and the raster of each camera, means responsive to the determination of the angles between said pattern and said raster, for rotating the raster of one of said cameras by providing new signals to the horizontal and vertical deflection schemes of said cameras.

10. Means as claimed in claim 9 comprising means, subsequent to said rotation for analizing said two level signal to detect the information in said pattern.

11. Means for scanning a pattern movable relative to and through the field of view of a television camera wherein the pattern includes a portion having marks of predetermined dimensions and of predetermined relative orientation and spacing contrasting with a background, and where said pattern is arranged to be scanned in predetermined orientation, comprising in combination, a television camera arranged to have a field of view including a portion of the locus of said movable pattern, said camera having horizontal and vertical deflection means, amd means for receiving horizontal and vertical scan signals to cause raster scanning and means for supplying these signals to the respective deflection means means for receiving the scan output of said television camera and producing at a plurality of predetermined intervals per line of said scan, a signal having one of two levels predetermined by whether said scan signal is of a level characteristic of said line or of a level characteristic of said background, where said intervals are small relative to the time to scan one of said location marks, means for analyzing said two level signal to identify the intersection of a scan line with the pattern, means for determining over at least two predetermined scan lines, the angle between said pattern and said raster, means responsive to the determination of the angle between said pattern and said raster, for rotating said raster by providing new signals to the horizontal and vertical deflection means.

12. Means as claimed in claim 11 comprising means, subsequent to said rotation for analyzing said two level signal to detect the information in said pattern.

13. Means as claimed in claim 11 wherein said camera is designed to provide the same horizontal and vertical deflection when the same signal is applied to the vertical and horizontal deflection circuits, respectively.

14. means as claimed in claim 13 comprising means, subsequent to said rotation for analyzing said two level signal to detect the information in said pattern.

* * * * *

UNITED STATES PATENT OFFICE

CERTIFICATE OF CORRECTION

Patent No. 3,902,047 Dated August 26, 1975

Inventor(s) Anton Roy Tyler et al.

It is certified that error appears in the above-identified patent and that said Letters Patent are hereby corrected as shown below:

Claim 4, line 21, "light contrasting areas" should read -- marks --.

Claim 4, line 22, after "characteristic" insert -- of --.

Claim 4, line 25, "area" should read -- information mark --.

Claim 4, third last line, after "tion" insert -- of said raster modifying the signal on the vertical --.

Claim 5, at the beginning of each of lines 14, 16 and 18 insert -- each --.

Claim 5, line 24, before "said" insert -- each --.

Claim 5, third last line change "said" to -- the --.

Claim 5, third last line after "means" insert -- of one of said cameras --.

Claim 9, starting at line 2 and ending at line 3 cancel the phrase "movable relative to and through the field".

UNITED STATES PATENT OFFICE

CERTIFICATE OF CORRECTION

Patent No. 3,902,047 Dated August 26, 1975

Inventor(s) Anton Roy Tyler et al.

It is certified that error appears in the above-identified patent and that said Letters Patent are hereby corrected as shown below:

Claim 9, line 6, "overlation" should read -- orientation --.

Signed and Sealed this

*Third* Day of *October 1978*

[SEAL]

*Attest:*

RUTH C. MASON
*Attesting Officer*

DONALD W. BANNER
*Commissioner of Patents and Trademarks*